United States Patent [19]
Keller et al.

[11] Patent Number: 5,874,514
[45] Date of Patent: Feb. 23, 1999

[54] SILOXANE UNSATURATED HYDROCARBON BASED POLYMERS

[76] Inventors: Teddy M. Keller, 6633 Sky Blue Ct., Alexandria, Va. 22315; David Y. Son, 906 N. Iverson St. Apt. 202, Alexandria, Va. 22304

[21] Appl. No.: 437,742
[22] Filed: May 9, 1995
[51] Int. Cl.⁶ .................................................. C08G 77/06
[52] U.S. Cl. .............................. 528/25; 528/32; 528/35; 556/431
[58] Field of Search .............................. 528/25, 32, 35; 556/431

[56] References Cited

U.S. PATENT DOCUMENTS

| | | | |
|---|---|---|---|
| 2,671,099 | 3/1954 | Frisch et al. | 260/448.2 |
| 2,671,100 | 3/1954 | Frisch et al. | 260/448.2 |
| 2,671,101 | 3/1954 | Frisch et al. | 260/448.2 |
| 3,234,288 | 2/1966 | D'Alello | 260/606.5 |
| 3,397,221 | 8/1968 | Papetti | 260/448.2 |
| 3,457,222 | 7/1969 | Papetti | 260/46.5 |
| 3,457,223 | 7/1969 | Papetti | 260/46.5 |
| 3,488,371 | 1/1970 | Klebe | 260/448.2 |
| 3,542,730 | 11/1970 | Papetti et al. | 260/448.2 |
| 3,661,847 | 5/1972 | Chapman | 260/46.5 E |
| 3,714,118 | 1/1973 | Chandra et al. | 528/42 |
| 3,733,298 | 5/1973 | Knalaneller | 260/46.5 E |
| 4,145,504 | 3/1979 | Hedaya et al. | 528/5 |
| 4,208,492 | 6/1980 | Hedaya et al. | 525/389 |
| 4,235,987 | 11/1980 | Peters | 528/5 |
| 4,269,757 | 5/1981 | Mine et al. | 260/37 |
| 4,857,490 | 8/1989 | Johnson | 501/96 |
| 4,946,919 | 8/1990 | Johnson | 526/285 |
| 4,965,332 | 10/1990 | Barton et al. | 528/25 |
| 5,231,158 | 7/1993 | Lewis et al. | 528/15 |
| 5,243,060 | 9/1993 | Barton et al. | 556/435 |
| 5,272,237 | 12/1993 | Keller et al. | 528/5 |
| 5,292,779 | 3/1994 | Keller et al. | 522/99 |
| 5,348,917 | 9/1994 | Keller et al. | 501/92 |
| 5,420,238 | 5/1995 | Ito et al. | 528/481 |

FOREIGN PATENT DOCUMENTS 2234517  6/1991  United Kingdom .

OTHER PUBLICATIONS

Zeldin et al., "Inorganic and Organometallic Polymers", American Chemical Society, Washington, DC, (1988), pp. 44–96.
Ijadi–Maghsoodi et al., "Efficient, One–Pot Synthesis of Silylene–Acetylene and Disilylene–Acetylene Preceramic Polymers from Trichloroethylene", Journal of Polymer Scienc: Part A: vol. 28, (1990), pp. 955–965.
Wynne et al., "Ceramics via Polymer Pyrolysis", Annual Review Material Science, (1984), 14, pp. 297–333.
Dvornic et al., "High Temperature Siloxanne Elastomers", Huthig & Wepf Verlag Basel, N.Y., (1990), pp. 277–305.
Peters, "Poly(dodecarborane–siloxanes)", J. Macromol. Sci.–Rev. Macromol. Chem., C17(2), (1979), pp. 173–209.
Papetti et al., "A New Series of Organoborances. VII. The Preparation of Poly–m–Carboranylenesiloxance", Journal of Polymer Science, Part A–1, vol. 4, (1966), pp. 1623–1636.

Ijadi–Maghsoodi et al., "Synthesis and Study of Silylene–Diacetylene Polymers", Macromolecles, vol. 23, No. 20, (1990), pp. 4486–4487.
Bock et al., "d–Orbital Effects in Silicon Substituted II–Electron Systems. Part XII. Some Spectroscopic Properties of Alkyl and Silyl Acetylenes and Polyacetylenes", J. Chem. Soc. (B), (1968), pp. 1158–1163.
Eastmond et al., "Silylation as a Protective Method for Terminal Alkynes in Oxidative Couplings—A General Synthesis of the Parent Polyynes", 28 Tetrahedron (1972), pp. 4601–4616.
Papetti et al., "A New Series of Organoboranes. VI. The Synthesis and Reactions of Some Silyl Neocarboranes", Inorganic Chemistry, vol. 3, No. 10, Oct. 1964, pp. 1448–1450.
Scott et al., "Icosahedral Carboranes. XV. Monomeric Carboranylenesiloxanes", Inorganic Chemistry, vol. 9, No. 11, (1970), pp. 2597–2600.
Callstrom et al., "Poly(ethynylene(3II–butyl–2, 5–thiophenediyl)–ethynylene): A Soluble Polymer Containing Diacetylene Units and Its Conversion to a Highly Cross–Linked Organic Solid", Macromolecules, vol. 21, No. 12, (1988), pp. 3528–3530.
Neenan et al., "Hypercross–Linked Organic Solids: Preparation from Poly(aromatic diacetylenes) and Preliminary Measurements of Their Young's Modulus, Hardness and Thermal Stability", Macromolecules, vol. 21, (1988), pp. 3525–3528.
Son et al., "Linear Siloxane Polymers as Precursors to High Temperature Materials", PMSE, (1994), 71, pp. 305–306.
Son et al., "Synthesis and Characterization of Linear Siloxane–Diacetylene Polymers", Macromolecules, vol. 28, No. 1, (1995), pp. 399–400.
Suzuki et al., "Synthesis and Properties of Silethynylene–Siloxane Alternating Copolymers", Eur. Polym. J., vol. 28, No. 11, (1992), pp. 1373–1376.
Komarov et al., "Acetylenic Siloxanes in the Grignard Synthesis", Izvestiya Akademii Nauk SSSR, Seriya Khimicheskaya, No. 3, Mar. (1972), pp. 698–699.
Parnell et al., "Oxidative Coupling as a Potential Route to Polymers of Group IV Acetylenes", Journal of Polymer Science, vol. 11, (1973), pp. 1107–1111.
Son et al., "Oxidatively Stable Linear Carborane–Siloxane–Diacetylene Copolymers", Polymer Preprints, vol. 36, No. 2, Aug. (1995), pp. 201–202.

*Primary Examiner*—Melvyn I. Marquis

[57] ABSTRACT

This invention relates to a new class of novel linear inorganic-organic hybrid polymers of varying molecular weight that are useful for making high temperature, oxidatively stable thermosets, and these novel linear polymers are in themselves oxidatively stable at high temperatures between 600°–1000° C. These new materials have repeat units that contain at least one alkynyl group and at least one siloxanyl group within the backbone of these novel linear polymers. These novel linear polymers can be further polymerized to form thermosets and ceramics.

30 Claims, 3 Drawing Sheets

SILOXANE UNSATURATED HYDROCARBON BASED POLYMERS

BACKGROUND OF THE INVENTION

1. Field of the Invention

The present invention generally relates to an organosiloxane polymer containing one or more siloxanyl groups and alkynyl groups within the backbone of the polymer. These polymers of varying molecular weight are useful for making thermosetting polymers and ceramics thereof, respectively, and these polymers are in themselves oxidatively stable at high temperatures.

2. Description of the Related Art

The recent literature reflects continuing major research efforts to advance fundamental knowledge in high temperature material design. See K. J. Wynne and R. W. Rice, *Ceramics Via Polymer Pyrolysis* 14 ANN. REV. MAT. SCI. 297 (1984).

In the search for high temperature oxidatively stable materials considerable attention has been given to polymers containing inorganic elements within the polymer.

Some polymers that have been manufactured have the following formula:

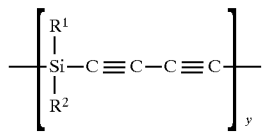

where $R^1=R^2=Me$, or $R^1=R^2=Ph$, or $R^1=Ph$ and $R^2=Me$ and where y is a positive integer. These polymers also show a weight loss in excess of 15–20% in an inert atmosphere when heated between 600°–1000° C. Greater weight loss is expected in an oxidative atmosphere when heated to the 600°–1000° C. range. See Table II of Maghsoodi et al. in *Synthesis and Study of Silylene-Diacetylene Polymers* published in 23 MACROMOLECULES pp. 4486 (1990).

There is an established need for siloxane and/or silyl polymeric materials that show high temperature stability where weight percentage loss is limited to 50% or less when heated in excess of 600° C. in an oxidative environment.

In addition, a majority of the siloxane or silyl polymers show elastomeric properties rather than properties of more rigid polymeric products like thermosetting polymers or ceramics. Thus, in addition to thermal stability, there is also a need for polymers that behave more as thermosets and ceramics, upon further polymerization, and less like elastomeric polymers.

SUMMARY OF THE INVENTION

It is therefore an object of the present invention to provide linear siloxane-alkynyl polymers that show less than 50% weight loss, in an oxidative (e.g. air) or inert (e.g. nitrogen) environment, when heated to temperatures between 600°–1000° C.

It is another object of the present invention to provide linear siloxane-alkynyl polymers which can be readily converted into high temperature thermosetting polymers or thermosets, upon further polymerization, rather than remain as elastomers, between 200°–1000° C.

It is another object of the present invention to provide linear siloxane-alkynyl polymers that have sufficiently low viscosities to readily fill complex dies for making components therefrom.

BRIEF DESCRIPTION OF THE DRAWINGS

A more complete appreciation of the present invention and several of the accompanying advantages thereof will be readily obtained by reference to the following detailed description when considered in conjunction with the accompanying drawings, wherein.

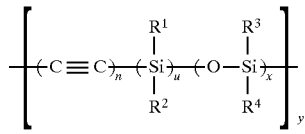

where $n=2$, $u=x=1$, $R^1=R^2=R^3=R^4=CH_3$, and $y\approx 50$ (MW$\approx$10,000).

Figure 2:
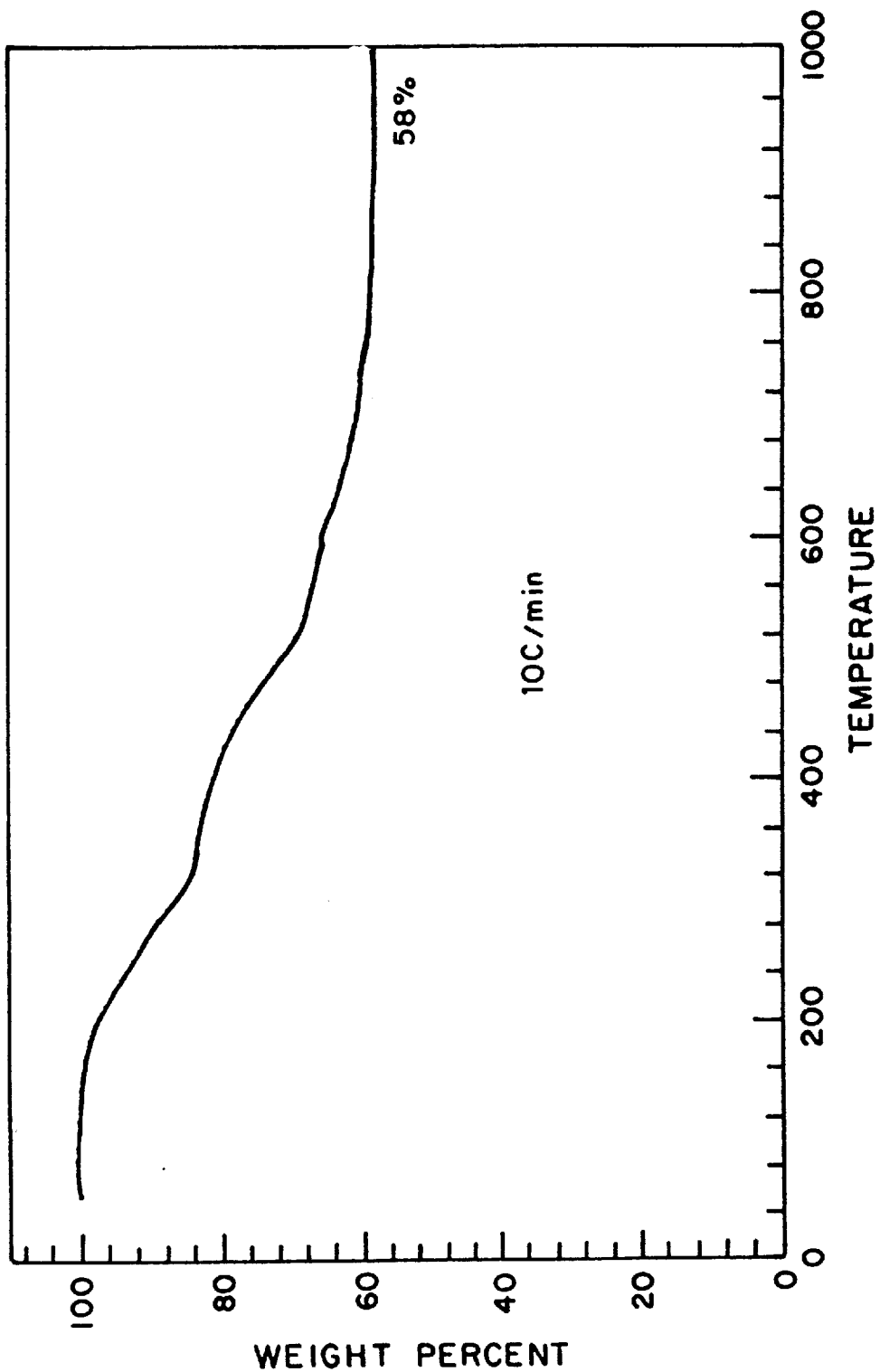

FIG. 2 is a thermogravimetric analytical (TGA) plot of weight % versus temperature in a nitrogen atmosphere for the polymer having the formula:

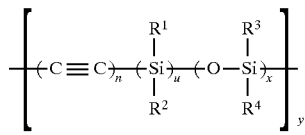

where $n=2$, $u=1$, $x=2$, $R^1=R^2=R^3=R^4=CH_3$, and $y\approx 50$ (MW$\approx$10,000).

Figure 1:
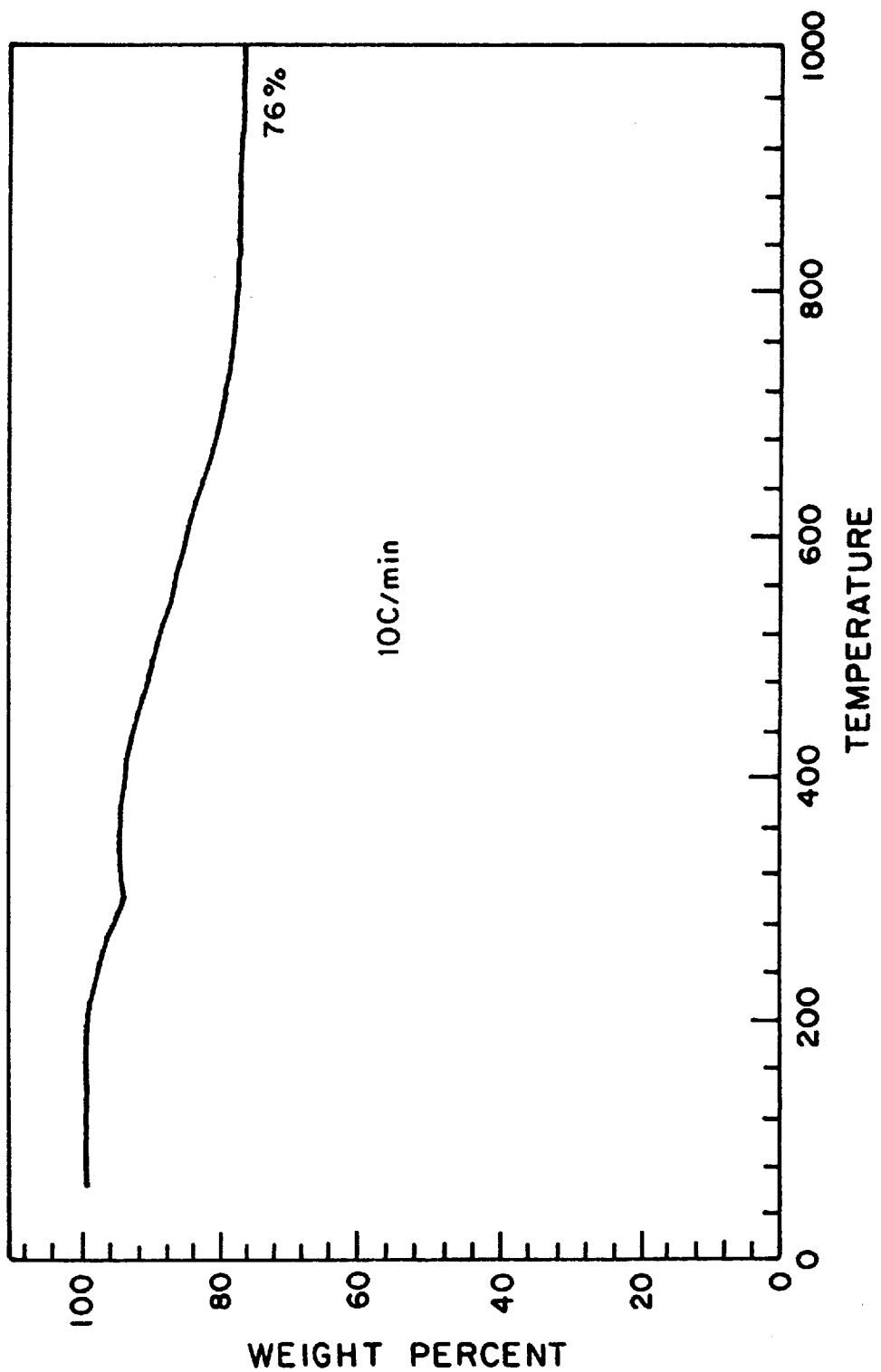
FIG. 1 is a thermogravimetric analytical (TGA) plot of weight % versus temperature in a nitrogen atmosphere for the polymer having the formula.
Figure 3:
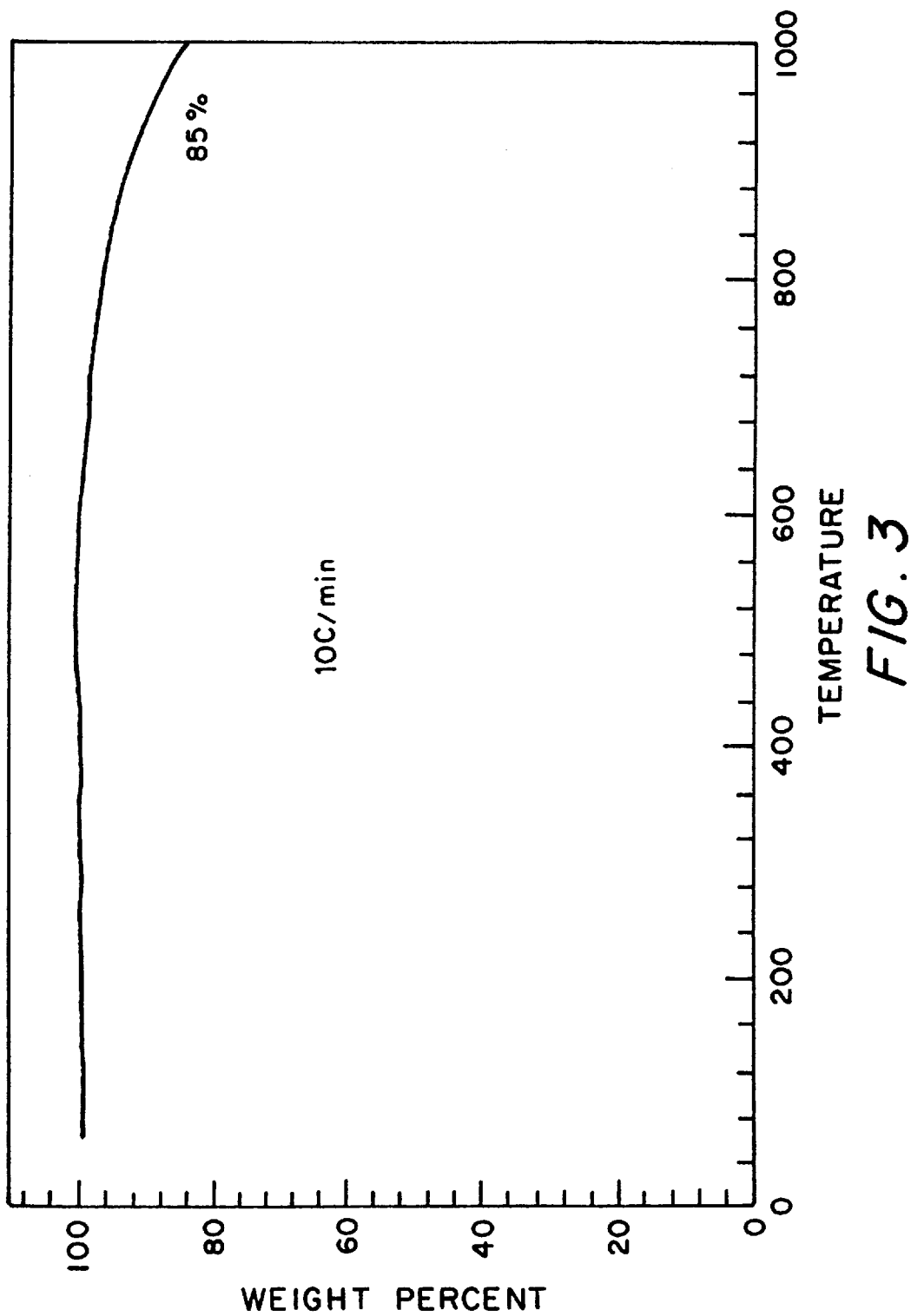

FIG. 3 is a TGA plot of weight percent versus temperature in an oxidizing environment (air) of the polymer remaining after the heating cycle depicted in FIG. 1 (i.e. a TGA plot of the char remaining after the heating cycle of FIG. 1).

The TGA plots in FIGS. 1, 2 and 3 were obtained wherein the temperature of the respective polymers were raised at a rate of 10 degrees Centigrade per minute.

DETAILED DESCRIPTION OF THE PREFERRED EMBODIMENT

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

This invention relates to a new class of novel linear inorganic-organic hybrid polymers of varying molecular weight having the general formula:

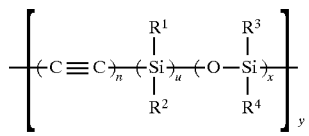

(2)

where:
(1) n is an integer 1, 2, 3, 4, 5, 6, 7, 8, 9, 10, 11, or 12 and u and y are positive integers;
(2) —(C≡C)$_n$— represents an unconjugated acetylenic moiety or a conjugated acetylenic moiety when n is an integer greater than 1;
(3) $R^1$, $R^2$, $R^3$ and $R^4$ represent alkyl, aryl, alkylaryl, haloalkyl, haloaryl and mixtures thereof (e.g. aliphatic hydrocarbon moieties, aromatic hydrocarbon moieties, or mixtures thereof); and (4) x represents an integer greater than or equal to one (x≧1).

The value of y represents the length of polymer (2) reflected by the average molecular weight of polymer (2). The value of y is typically between about 40–150, more typically between about 42–100, most typically between about 44–80, preferably between about 46–70, more preferably between about 48–60, and most preferably between about 50–55. The average molecular weight is proportional to the length y and the average length (average y) of polymer (2).

The novel linear inorganic-organic hybrid polymers (2) with repeating units containing at least one alkynyl or acetylenic group and at least one siloxanyl group are designed to take advantage of the thermo-oxidative stability of inorganics and the processability of organics.

The general chemical scheme for synthesizing these novel linear polymers (2) is represented by the exemplary synthesis of (2') given below:

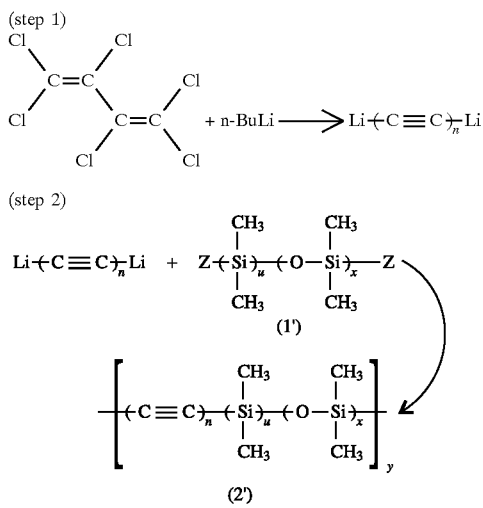

where:
(1) n=2, u=x=1, and y is a postive integer;
(2) —(C≡C)$_n$— represents a conjugated acetylenic moiety where n=2;
(3) $R^1=R^2=R^3=R^4=CH_3$;
(4) Z is selected from the group consisting of F, Cl, Br, I, acetyl and mixtures therof;
(5) Li—(C≡C)$_n$—Li represents a dilithio salt where n=2; and
(6) n-BuLi represents n-butyllithium.

Given the general scheme, step 1 involves forming a salt, for example, the dilithio salt of butadiyne by reacting 4 equivalents of n-BuLi with hexachlorobutadiene. To form the polymer (2'), step 2 involves reacting equal molar concentrations of the dilithiobutadiyne produced in step 1 with compound (1').

The use of equal molar amounts of the dilithiobutadiyne with compound (1') assures that the resulting compound has one acetylenic terminal and one siloxanyl terminal.

It should be noted that if trichloroethylene is used in step 1 instead of hexachlorobutadiene, a salt of ethyne or acetylene is formed in step 1 where n=1. Consequently, an ethynyl moiety is incorporated into the polymer produced in step 2 where n=1. By using hexachlorobutadiene in step 1, the salt of butadiyne is formed where n=2. In turn, a butadiyne moiety is incorporated into polymer (2') where n=2. In order to form a polymer where n=3, a salt of hexatriyne needs to be formed in step 1. The synthesis of the disodium salt of hexatriyne is given in the article by Bock and Seidl, *d-Orbital Effects in Silicon Substituted π-Electron Systems. Part XII. Some Spectroscopic Properties of Alkyl and Silyl Acetylenes and Polyacetylenes,* J. CHEM. SOC. (B), 1158 (1968) at pp. 1159. See also U.S. Pat. Nos. 5,272,237 and 5,292,779, each patent incorporated herein by reference in its entirety and for all purposes. Thus, by forming the appropriate alkynyl salt, the length of the alkynyl moiety, represented by the value of n, incorporated into the polymer formed in step 2 can be controlled. Typically, the value of n can be varied from 1 to 12. For example, n is an integer 1, 2, 3, 4, 5, 6, 7, 8, 9, 10, 11, 12. Acetylenic derivatives having the general formula H(C≡C)$_n$H can be readily converted into the dilithio salts by reacting with n-butyllithium. The respective dilithio salts, with values of n varying from 1 to 12, can then be incorporated into the backbone of polymers (2) as shown in the aforementioned step 2. The value of n can be varied, typically, from 1 to 12, more often from 1 to 10 and 1 to 8, most often from 1 to 6 and, in particular, from 1 to 3 and 1 to 2. Acetylenic derivatives having the general formula H(C≡C)$_n$H can be readily formed by the synthesis given by Eastmond et al. in *Silylation as a Protective Method for Terminal Alkynes in Oxidative Couplings—A General Synthesis of the Parent Polyynes,* 28 TETRAHEDRON 4601 (1972).

Furthermore, a variety of compounds can be produced that have structures similar to that of compound (1') shown in step 2. One variation includes replacing the methyl groups attached to the Si with other hydrocarbon or aromatic moieties. Typical reactions synthesizing disubstituted dichloro silanes of varying size (varying values of u) and having different R groups are known in the art:

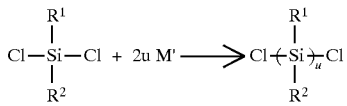

where M' is a group 1 metal or alloy. The above reaction is cited by ZELDIN ET AL. (EDITORS) in INORGANIC AND ORGANOMETALLIC POLYMERS, published by American Chemical Society, Washington, DC (1988) at 44 and 90.

The value of u can be varied. Typically, the value of u can be varied from 1 to 1000. More typically, the value of u can be varied from 1 to 500. Even more typically, the value of u can be varied from 1 to 250. Most typically, the value of u can be varied from 1 to 100. Preferably, the value of u can be varied from 1 to 10. More preferably, the value of u can be varied from 1 to 6. Another variation includes controlling the values of x in addition to that of u.

For example, while leaving u=1, the value of x can be varied. Typically, the value of x can be varied from 0–1000. More typically, the value of x can be varied from 1–1000. Even more typically, the value of x can be varied from 0–500. Most typically, the value of x can be varied from 1–500. Preferably, the value of x can be varied from 0–250. More preferably, the value of x can be varied from 1–500. Even more preferably, the value of x may be varied from 0–10. Most preferably, the value of x can be varied from 1–10. The value of x may also be varied from 0–2. In addition, the value of x may be varied from 1–2. The value of x may be varied by the following proposed reaction scheme.

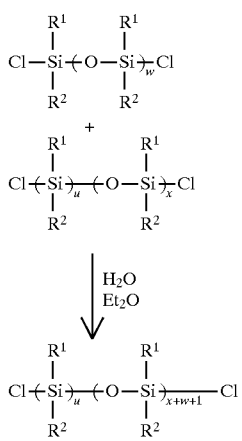

where x and w are integers greater than or equal to 0 (x≧0; w≧0) and u is a postive integer.

Following the scheme in the aforementioned steps 1 and 2, the novel linear polymers (2) can be formed by reacting a salt of an alkyne or a respective Grignard reagent with compound (1) as depicted by the exemplary reaction:

(step 2)

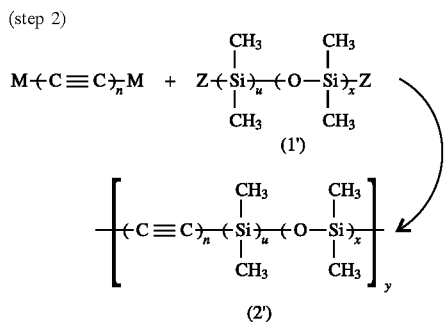

where:

(1) n is an integer 1, 2, 3, 4, 5, 6, 7, 8, 9, 10, 11, or 12 and u and y are postive integers;

(2) —(C≡C)$_n$— represents an unconjugated acetylenic moiety or a conjugated acetylenic moiety when n is an integer greater than 1;

(3) $R^1$, $R^2$, $R^3$ and $R^4$ are exemplary methyl groups;

(4) Z is selected from the group consisting of F, Cl, Br, I, acetyl and mixtures thereof;

(5) M—(C≡C)$_n$—M represents a salt of an alkyne or the respective Grignard reagent where M is selected from the group consisting of Li, Na, K and MgX' where X' is selected from the group consisting of F, Cl, Br and I; and (6) x represents an integer greater than or equal to one (X≧1).

These novel linear polymers (2) exhibit sufficiently low viscosities either at room temperature or at their respective melting points (mp≈200° C.) to readily fill complex dies or shapes for forming parts therefrom. In addition, these polymers (2) can be further polymerized into thermosets and ceramics that form rigid shapes which are oxidatively stable at high temperatures above 600° C.

The following examples are included to aid those skilled in the art to fully understand the presently claimed invention. In no way are the examples intended to limit the scope or breadth of the claimed invention. Instead, the examples merely aid those skilled in the art to more fully understand the presently claimed invention without limiting the scope of the present invention.

EXPERIMENTAL DATA AND EXAMPLES

All reactions were carried out in an inert atmosphere unless otherwise noted. Solvents were purified by established procedures. 1,3-Dichlorotetramethyldisiloxane and 1,5-dichlorohexamethyltrisiloxane were obtained from Silar Laboratories and used as received. n-Butyllithium (2.5M in hexane) was obtained from Aldrich and titrated before use. Hexachlorobutadiene was obtained from Aldrich and distilled before use. Thermogravimetric analyses (TGA) were performed on a DuPont 951 thermogravimetric analyzer. Differential scanning calorimetry analyses (DSC) were performed on a DuPont 910 instrument. Unless otherwise noted, all thermal experiments were carried out at a heating rate of 10° C./min and a nitrogen flow rate of 50 mL/min. Infrared spectra were obtained using a Nicolet Magna 750 FTIR spectrophotometer. Gel-permeation chromatography (GPC) data were obtained using a Hewlett-Packard Series 1050 pump and two Altex μ-spherogel columns (size $10^3$ and $10^4$ Å respectively) connected in series. All values were referenced to polystyrene. $^1$H NMR and $^{13}$C NMR spectroscopy were performed on a Bruker AC-300 spectrometer using CDCl$_3$ as solvent. Elemental analyses were performed by Galbraith Laboratories, Knoxville, Tenn.

Example 1

Preparation of 1,4-dilithio-1,3-butadiyne

A hexane solution of n-BuLi (10.6 mL of a 2.5M solution, 26.5 mmol) was added to a flask containing THF (5 mL) cooled in a dry ice/acetone bath. Subsequently, hexachlorobutadiene (0.99 mL, 6.3 mmol) was added dropwise via syringe, resulting in the formation of a heavy precipitate. After completion of addition, the cold bath was removed and the reaction mixture was stirred at room temperature for two hours. The resulting dark-brown mixture was used without further treatment.

Example 2

Preparation of Polymer 2
wherein (n=2; u=1; x=1, $R^1$=$R^2$=$R^3$=$R^4$=CH$_3$; and y>0)

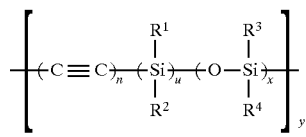

A mixture of 1,4-dilithio-1,3-butadiyne (6.3 mmol) in THF/hexane was cooled in a dry ice/acetone bath. To this mixture, 1,3-dichlorotetramethyldisiloxane (1.24 mL, 6.3 mmol) was added dropwise over 15 min. After addition, the cold bath was removed and the mixture was stirred at room temperature for two hours. The tan mixture was poured into 20 mL of ice-cooled saturated aqueous ammonium chloride solution with stirring. The mixture was filtered through a Celite pad and the layers were separated. The aqueous layer was extracted twice with Et$_2$O and the combined organic layers were washed twice with distilled water and once with saturated aqueous NaCl solution. The dark brown organic layer was dried over anhydrous magnesium sulfate and filtered. Most of the volatiles were removed at reduced pressure and the residue was heated at 75° C. for three hours at 0.1 torr to give 2 as a thick, dark brown material (1.04 g, 92%). Polymer 2 slowly solidifies on standing at room temperature and liquefies at approximately 70° C. $^1$H NMR (ppm) 0.30 (s, 12H, —Si(cH$_3$)); $^{13}$C NMR (ppm) 1.7, 1.9 (—Si(CH$_3$)), 84.9 (—Si—C≡C—), 86.9 (—Si—C≡C—). Anal. Calcd. for (C$_8$H$_{12}$OSi$_2$)$_n$: C, 53.31; H, 6.66; Si, 31.16. Found: C, 55.81; H, 7.61; Si, 27.19. Mw=10700, Mn=2300, polydispersity=4.7.

Example 3

Preparation of Polymer 2
wherein (n=2; u=1; x=2, R$^1$=R$^2$=R$^3$=R$^4$=CH$_3$; and y>0)

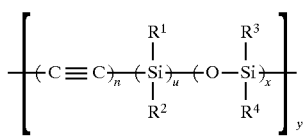

The same procedure that was used in the preparation of 1 was used in the reaction of 6.3 mmol of 1,4-dilithio-1,3-butadiyne with 1,5-dichlorohexamethyltrisiloxane (1.72 mL, 6.3 mmol). The same workup procedure yielded 2 as a slightly viscous dark brown oil (1.44 g, 90%). $^1$H NMR (ppm) 0.11 (s, 6H, —C≡C—SiOSi(CH$_3$)$_2$—), 0.26 (s, 12H, —C≡C—Si(CH$_3$)$_2$—); $^{13}$C NMR (ppm) 85.2 (—Si—C≡C—), 86.8 (—Si—C≡C—). Anal. Calcd. for (C$_{10}$H$_{18}$O$_2$Si$_3$)$_n$: C, 47.22; H, 7.08; Si, 33.12. Found: C, 48.98; H, 7.59; Si, 29.45 Avg. Mw (Weight average molecular weight)=9900, Mn (number average molecular weight)=2500, polydispersity=4.0.

What is claimed is:

1. An organic-inorganic polymer having the formula:

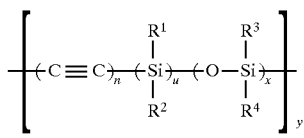

wherein:
(1) n is an integer 1, 2, 3, 4, 5, 6, 7, 8, 9, 10, 11 or 12 and u and y are positive integers wherein y is greater than or equal to 40;
(2) represents an unconjugated acetylenic moiety or a conjugated acetylenic moiety when n is an integer greater than 1;
(3) R$^1$, R$^2$, R$^3$ and R$^4$ represent alkyl, aryl, alkylaryl haloalkyl, haloaryl, and mixtures thereof; and
(4) x represents an integer greater than or equal to one; wherein said polymer is made by a process consisting essentially of the step of:
reacting a salt or a Grignard agent having the formula:

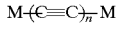

wherein:
(1) M is selected from the group consisting of Li, Na, K and MgX' where X' is selected from the group consisting of F, Cl, Br and I;
(2) —(C≡C)$_n$— represents a moiety as previously indicated; and
(3) n is a positive integer as previously indicated; with an equal molar amount of a siloxane having the formula:

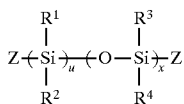

wherein:
(1) Z is selected from the group consisting of F, Cl, Br, I, acetyl or mixtures thereof;
(2) R$^1$, R$^2$, R$^3$ and R$^4$ are as previously indicated; and
(3) x, u, are integers as previously indicated.

2. The polymer of claim 1, wherein said polymer has one terminal —(C≡C)$_n$—
group and one terminal

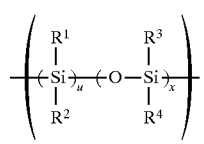

group, and n, u, x, R$^1$, R$^2$, R$^3$, and R$^4$ are as defined above.

3. The polymer of claim 1 wherein said R$^1$, said R$^2$, said R$^3$ and said R$^4$ are the same or different and wherein each said R$^1$, said R$^2$, said R$^3$ and said R$^4$ represents a hydrocarbon group being selected from the group consisting of alkyl, aryl, alkylaryl, haloalkyl, haloaryl and mixtures thereof.

4. The polymer of claim 1 wherein said u is an integer from 1–1000 and said y is an integer from 40–150 and said x is an integer from 1 to 1000 and said n is an integer from 1 to 12.

5. The polymer of claim 1 wherein said u is an integer from 1–500 and said y is an integer from 42–100 and said x is an integer from 1 to 500 and said n is an integer from 1 to 10.

6. The polymer of claim 1 wherein said u is an integer from 1–250 and said y is an integer from 44–80 and said x is an integer from 1 to 250 and said n is an integer from 1 to 8.

7. The polymer of claim 1 wherein said u is an integer from 1–100 and said y is an integer from 46–70 and said x is an integer from 1 to 100 and said n is an integer from 1 to 6.

8. The polymer of claim 1 wherein said n is an integer from 1 to 3 and said u is an integer from 1 to 10 and said x is an integer from 1 to 10.

9. The polymer of claim 1 wherein said n is an integer from 1 to 2 and said u is an integer from 1 to 10 and said x is an integer from 1 to 10.

10. The polymer of claim 1 wherein n is 3, 4, 5, 6, 7, 8, 9, 10, 11 or 12 and u is an integer between 1 to 10 and x is an integer from 1 to 10.

11. The polymer of claim 1 wherein said n equals 1 and said u is an integer from 1 to 6 and said x is an integer from 1 to 2.

12. The polymer of claim 1 wherein n is between 3 to 12, u is between 1 to 10, x is between 1 to 10 and y is between 40 to 150.

13. The polymer of claim 1 wherein n is between 3 to 12, u is between 1 to 10, x is between 1 to 10 and y is between 42 to 100.

14. The polymer of claim 1 wherein n is between 3 to 12, u is between 1 to 10, x is between 1 to 10 and y is between 44 to 80.

15. The polymer of claim 1 wherein n is between 3 to 12, u is between 1 to 10, x is between 1 to 10 and y is between 46 to 70.

16. The polymer of claim 1 wherein n is between 3 to 12, u is between 1 to 10, x is between 1 to 10 and y is between 48 to 60.

17. The polymer of claim 1 wherein n is between 3 to 12, u is between 1 to 10, x is between 1 to 10 and y is between 50 to 55.

18. The polymer of claim 1 wherein said y is between about 40–150.

19. The polymer of claim 18 wherein said y is between about 42–100.

20. The polymer of claim 19 wherein said y is between about 44–80.

21. The polymer of claim 20 wherein said y is between about 46–70.

22. The polymer of claim 21 wherein said y is between about 48–60.

23. The polymer of claim 22 wherein said y is between about 50–55.

24. An organic-inorganic polymer having the formula:

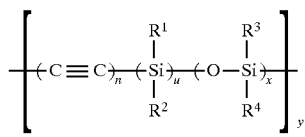

wherein:

(1) n is an integer 1, 2, 3, 4, 5, 6, 7, 8, 9, 10, 11 or 12 and u and y are positive integers wherein y is greater than or equal to 40;

(2) represents an unconjugated acetylenic moiety or a conjugated acetylenic moiety when n is an integer greater than 1;

(3) $R^1$, $R^2$, $R^3$ and $R^4$ represent alkyl, aryl, alkylaryl haloalkyl, haloaryl, and mixtures thereof; and (4) x represents an integer greater than or equal to one; said polymer having one terminal $-(C\equiv C)_n-$ group and one terminal

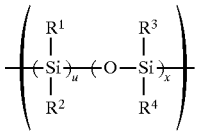

group, where n, u, x, $R^1$, $R^2$, $R^3$, and $R^4$ are as defined above.

25. The polymer of claim 24 wherein said y is between about 40–150.

26. The polymer of claim 15 wherein said y is between about 42–100.

27. The polymer of claim 26 wherein said y is between about 44–80.

28. The polymer of claim 27 wherein said y is between about 46–70.

29. The polymer of claim 28 wherein said y is between about 48–60.

30. The polymer of claim 29 wherein said y is between about 50–55.

* * * * *

UNITED STATES PATENT OFFICE
CERTIFICATE OF CORRECTION

PATENT NO. : 5,874,514
DATED : FEBRUARY 23, 1999
INVENTOR(S) : KELLER, et al

It is certified that error appears in the above-identified patent and that said Letters Patent is hereby corrected as shown below:

On the Title page, item 73, insert:

-- Assignee:    The United States of America
                as Represented by the Secretary
                of the Navy, Washington, D.C.--

Signed and Sealed this

Twentieth Day of March, 2001

Attest:

NICHOLAS P. GODICI

Attesting Officer        Acting Director of the United States Patent and Trademark Office